United States Patent
Gretz

(10) Patent No.: US 9,027,208 B1
(45) Date of Patent: *May 12, 2015

(54) WIRE GRIPPING ASSEMBLY FOR DROP WIRE SUPPORT OF ELECTRICAL BOXES OR LIGHT FIXTURES

(71) Applicant: Arlington Industries, Inc., Scranton, PA (US)

(72) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/064,683

(22) Filed: Oct. 28, 2013

Related U.S. Application Data

(63) Continuation-in-part of application No. 29/460,462, filed on Jul. 11, 2013.

(51) Int. Cl.
 *F16G 11/00* (2006.01)
 *F16M 13/02* (2006.01)

(52) U.S. Cl.
 CPC .................................. *F16M 13/027* (2013.01)

(58) Field of Classification Search
 CPC ......... F16G 11/00; F16G 11/06; E04B 9/006; E04B 9/20; E01F 15/06; F21V 21/16
 See application file for complete search history.

(56) References Cited

U.S. PATENT DOCUMENTS

| | | | | |
|---|---|---|---|---|
| 209,233 A | * | 10/1878 | Cox | 24/135 R |
| 748,716 A | * | 1/1904 | Ford | 439/781 |
| 815,422 A | * | 3/1906 | Gregory | 248/328 |
| 1,057,484 A | * | 4/1913 | Huber | 24/135 N |
| 1,873,559 A | * | 8/1932 | Dibner | 403/396 |
| 1,934,702 A | * | 11/1933 | Fante | 403/218 |
| 2,134,623 A | * | 10/1938 | Rowe | 439/764 |
| 2,208,358 A | * | 7/1940 | Chandler | 248/540 |
| 2,288,844 A | * | 7/1942 | Schilling | 248/66 |
| 2,288,845 A | * | 7/1942 | Schilling | 248/66 |
| 2,395,204 A | * | 2/1946 | Symons | 24/569 |
| 2,462,969 A | * | 3/1949 | Holliday | 188/65.1 |
| 2,497,030 A | * | 2/1950 | Lewis | 439/793 |
| 2,634,475 A | * | 4/1953 | Browne | 24/135 N |
| 2,785,503 A | * | 3/1957 | Schaefer | 446/227 |
| 2,884,673 A | * | 5/1959 | Ellsworth | 403/206 |
| 2,946,108 A | * | 7/1960 | Bethea | 24/135 L |
| 3,319,306 A | * | 5/1967 | Von Tersch | 24/71.1 |
| 3,373,846 A | * | 3/1968 | Gaughan, Jr. | 188/64 |
| 3,605,491 A | * | 9/1971 | Senn | 73/862.541 |
| 3,670,372 A | * | 6/1972 | Crosby et al. | 403/366 |

(Continued)

*Primary Examiner* — Bradley Duckworth

(57) ABSTRACT

A wire gripping assembly for securing an electrical box or light fixture to a support. The wire gripping assembly includes a wire gripping device having a body with open channels and a through bore, a clip member having legs for sliding engagement within the channels, a cable having an end connector thereon, and a thumbscrew for adjusting the clip member with respect to the body. The thumbscrew includes a head having an outer circumference with serrations to enable hand tightening and an end with a slot for engagement by a screwdriver or similar tool. The wire gripping assembly eases installation of an electrical device to an overhead support by enabling a two-step connection including initial hand tightening using the serrated outer surface of the thumbscrew and subsequent secure tightening by engaging the slot of the thumbscrew with a screwdriver or similar tool.

16 Claims, 11 Drawing Sheets

(56) References Cited

U.S. PATENT DOCUMENTS

| | | | | |
|---|---|---|---|---|
| 4,604,888 A | * | 8/1986 | Mayszak | 72/332 |
| 4,646,395 A | * | 3/1987 | Mayszak | 24/135 R |
| 4,662,035 A | * | 5/1987 | Hatfield | 24/135 R |
| 4,706,345 A | * | 11/1987 | Rockenfeller et al. | 24/135 L |
| 4,707,891 A | * | 11/1987 | Chidester | 24/136 R |
| 4,912,814 A | * | 4/1990 | McKenzie | 24/115 H |
| 5,129,844 A | * | 7/1992 | Goto et al. | 439/778 |
| 5,539,152 A | * | 7/1996 | Gretz | 174/663 |
| 6,327,753 B1 | * | 12/2001 | Rushing | 24/135 N |
| D620,346 S | * | 7/2010 | Gretz | D8/396 |
| D620,786 S | * | 8/2010 | Gretz | D8/396 |
| 8,076,573 B1 | * | 12/2011 | Gretz | 174/40 R |
| 8,158,882 B1 | * | 4/2012 | Gretz | 174/40 R |
| 8,302,265 B1 | * | 11/2012 | Gretz | 24/135 A |
| 8,567,742 B2 | * | 10/2013 | Sizelove et al. | 248/505 |
| 2005/0015940 A1 | * | 1/2005 | Stafford | 24/135 N |

* cited by examiner

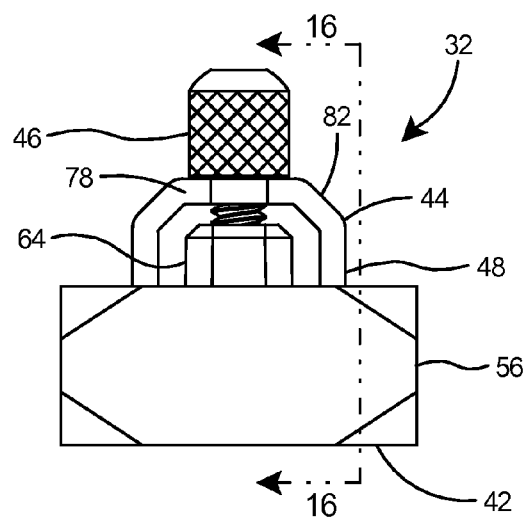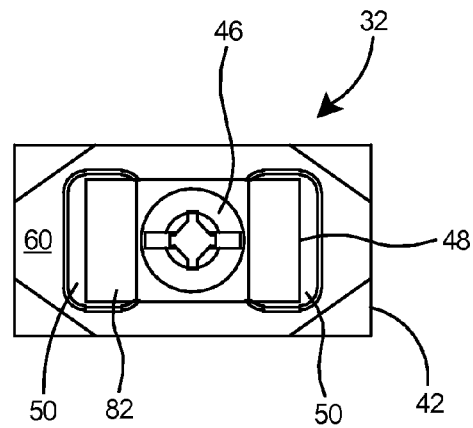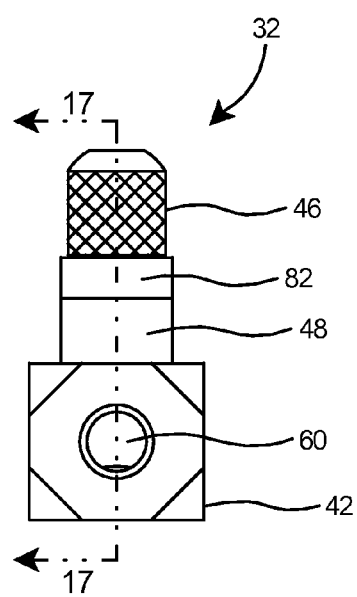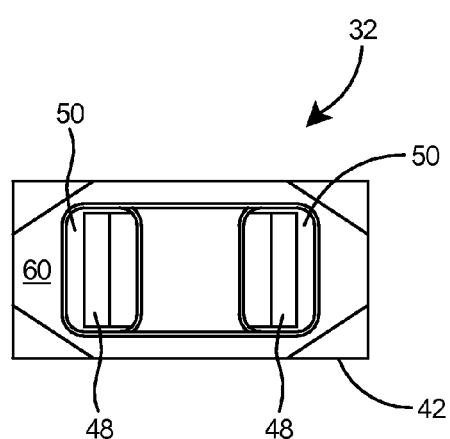
Fig. 12   Fig. 13
Fig. 14   Fig. 15

WIRE GRIPPING ASSEMBLY FOR DROP WIRE SUPPORT OF ELECTRICAL BOXES OR LIGHT FIXTURES

This application is a Continuation-In-Part of U.S. patent application Ser. No. 29/460,462 filed Jul. 11, 2013 and still pending, which is incorporated herein in its entirety by reference thereto.

FIELD OF THE INVENTION

The present invention relates to devices for the installation of electrical outlet or junction boxes and more particularly to a wire gripping assembly useful for the suspension of electrical outlet boxes or light fixtures from above as might be required in suspended ceiling installations and the like.

BACKGROUND OF THE INVENTION

Commonly owned parent application Serial No. 29/460,462 disclosed the ornamental design for a wire gripping device with a knurled thumbscrew. The wire gripping device is used for the adjustable suspension of electrical boxes or light fixtures from above as might be required in suspended ceiling installations and the like.

Although many overhead support devices have been proposed for the support of electrical boxes or light fixtures, the devices are usually cumbersome to operate as the installer must typically support the electrical box or light fixture while at the same time manipulating a tool, such as a screwdriver, to complete the installation.

What is needed is an improved overhead support device that eases the installation task by enabling the installer to at first hand tighten the electrical box or light fixture to the overhead support to hold it in place, and afterwards to complete the installation by tightening the connections with a screwdriver. Providing a hand tightening capability to the overhead support device enables the installer to quickly connect the suspended device to an overhead support while also freeing the installer's hands to subsequently complete the installation by tightening the connections with a screwdriver.

SUMMARY OF THE INVENTION

According to the present invention, there is provided a wire gripping assembly for enabling an installer to secure an electrical box or light fixture to a support in two steps, including initially hand tightening the wire gripper and subsequently securely tightening with a screwdriver. The wire gripping assembly positively locks a wire or cable in place between an overhead support and a suspended load such that it can support the suspended load and maintain tension on the wire. The wire gripping assembly includes a wire gripping device and a cable for supporting an electrical box or light fixture. The wire gripping device includes a knurled thumbscrew that enables initial hand tightening connection of an electrical device to an overhead support. After initial hand tightening, an installer's hands are freed to complete the installation by tightening with a screwdriver or similar tool. The cable may include a loop or one or more hooks for effecting a quick and secure attachment of an electrical device to an overhead support.

OBJECTS AND ADVANTAGES

Several advantages are achieved with the wire gripping assembly of the present invention, including:

(1) The wire gripping assembly can be used to rapidly suspend an electrical box, light fixture, or similar load from a support.
(2) The wire gripping assembly eliminates the need for tools to effectively suspend an electrical box, light fixture, or similar load from a support.
(3) The wire gripping assembly will maintain tension on the suspended load while supporting it in place.
(4) The wire gripping assembly includes all of the components required for an installer to suspend an electrical box or light fixture from an overhead support.
(5) The wire gripping assembly will work in conjunction with conventional support wires of several diameters including 0.062-inch, 0.080-inch, and 0.093-inch diameter wires.
(6) The wire gripping assembly will support a maximum static load of 100 pounds for electrical boxes and a maximum static load of 75 pounds for light fixtures.

These and other objects and advantages of the present invention will be better understood by reading the following description along with reference to the drawings.

DESCRIPTION OF THE DRAWINGS

FIG. 12 is a side view of the wire gripper assembly of FIG. 1.
FIG. 13 is a top view of the wire gripper assembly.
FIG. 14 is an end view of the wire gripper assembly.
FIG. 15 is bottom view of the wire gripper assembly.

DETAILED DESCRIPTION OF THE INVENTION

Figure 21:
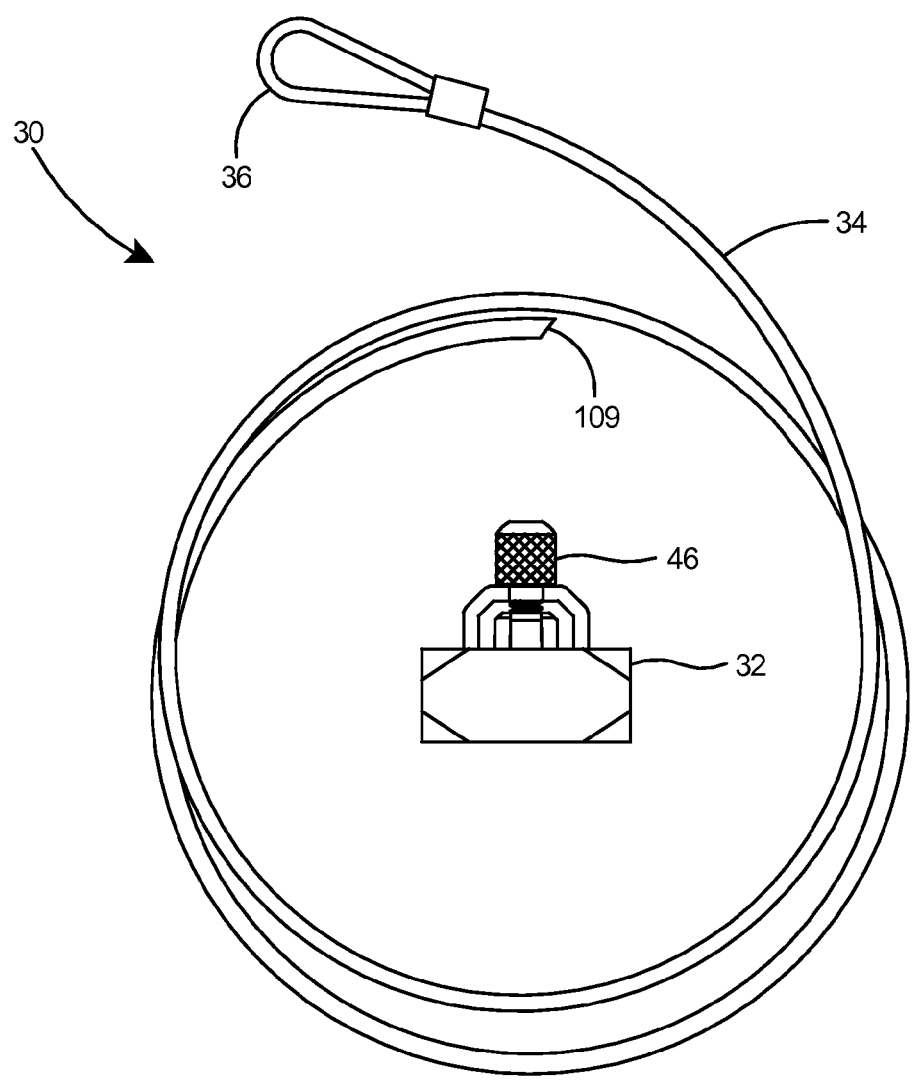
FIG. 21 is a plan view of a wire gripping assembly for supporting an electrical box.

With reference to FIG. 21 there is shown a preferred embodiment of a wire gripping assembly 30 including a wire gripper 32 and a cable 34 including an end connector thereon 36. The end connector 36 is a loop on one end of the cable 34.

Figure 1:
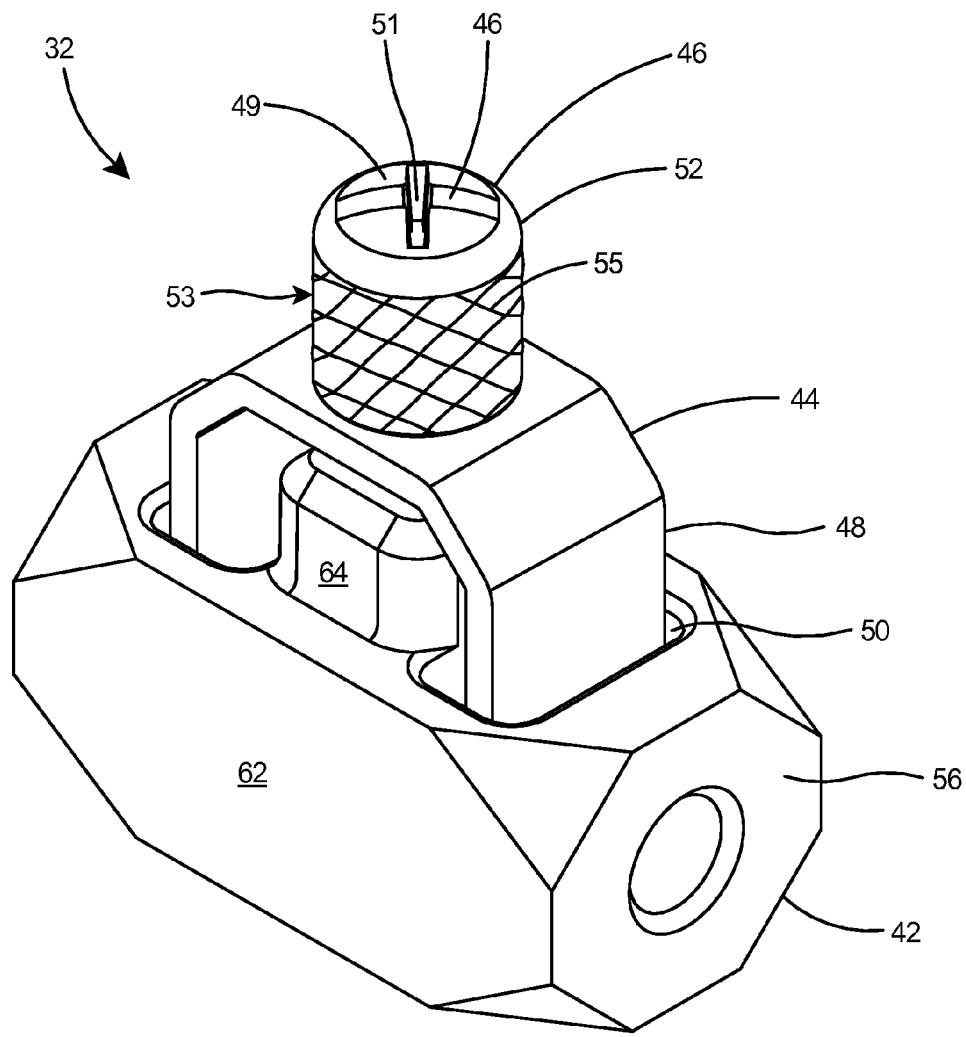
FIG. 1 an isometric view of a preferred embodiment of a wire gripper assembly according to the present invention.
Figure 2:
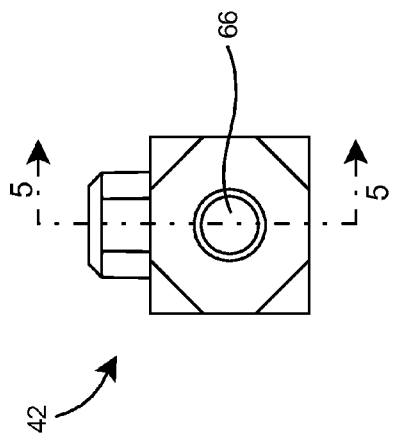
FIG. 2 is a side view of a wire gripper body that forms a portion of the wire gripper assembly of FIG. 1.
Figure 3:
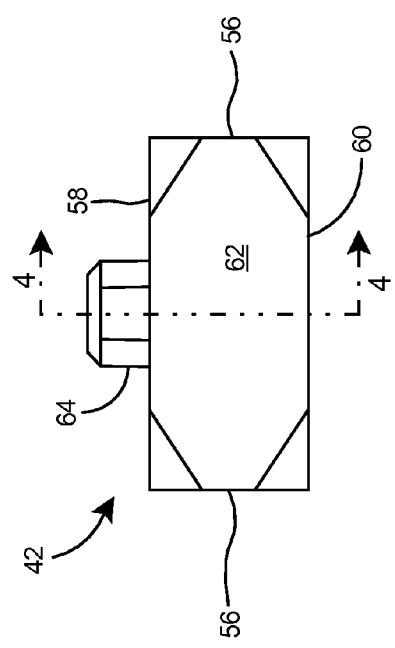
FIG. 3 is an end view of the wire gripper body.
Figure 4:
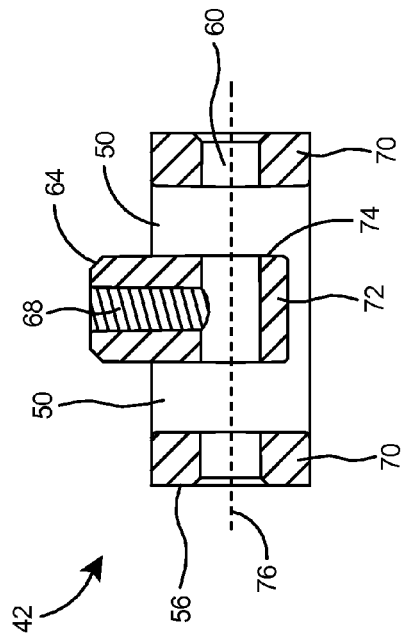
FIG. 4 is a sectional view of the wire gripper body taken along line 4-4 of
FIG. 2.

As shown in FIG. 1, the wire gripper 32 is an assembly of several parts including a body 42, a clip member 44, and a thumbscrew 46. Clip member 44 includes legs 48 thereon and body 42 of wire gripper 32 includes channels 50 for accepting slidable movement of the legs 48 of the clip member 44 therein. Thumbscrew 46 includes a large head 52 that engages the clip member 44 and enables adjustment of the clip member 44 with respect to the wire gripper body 42. The head 52 of thumbscrew 46 includes an end 49 having a slot 51 therein and an outer circumference 53 having serrations 55 thereon.

Referring to FIGS. 2-5, wire gripper body 42 is preferably constructed of metal and includes a base portion 54 having two ends 56, a top 58, a bottom 60, and two sides 62. A boss 64 is integral with the base 54 and extends orthogonally from the top 58 of the body 42. A through bore 66 extends longitudinally through the base 42 to both ends 56. A threaded bore 68 is centered in and extends through the boss 64 to the through bore 66. Although through bore 66 is shown herein as a circular bore in the drawings, it should be understood that through bore 66 can be of various shapes, including square, hexagonal, octagonal, oval, and others, without departing from the scope of the invention.

Figure 5:
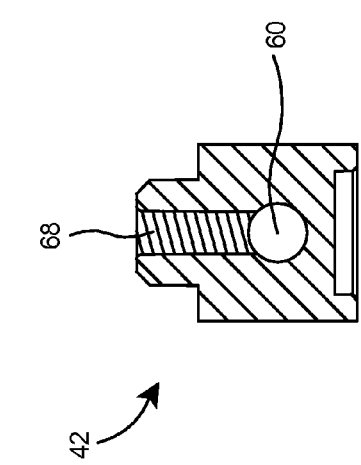
FIG. 5 is a sectional view of the wire gripper body taken along line 5-5 of FIG. 3.

As shown particularly in FIG. 5, two open channels 50, provided on either side of the boss 64, divide the body 42 into end portions 70 at each end 56 of the body 42. The through bore 66 also extends through the boss 64 thereby creating a ledge 72 in the boss 64 immediately below the through bore 66. The ledge 72 includes two ends 74 and is in axial alignment with the threaded bore 68. The various portions of the through bore 66 are in axial alignment along longitudinal axis 76 as shown in FIG. 5.

Figure 8:
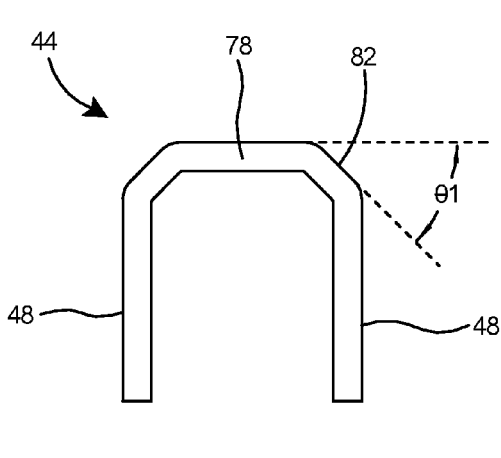
FIG. 8 is a side view of a clip member that forms a portion of the wire gripper of FIG. 1.
Figure 9:
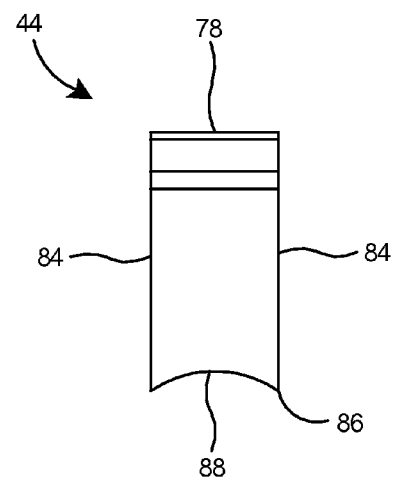
FIG. 9 is an end view of the clip member.
Figure 10:
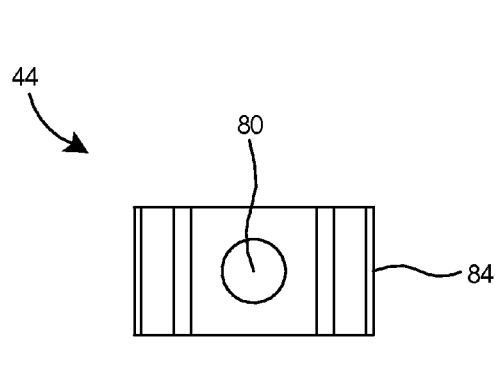
FIG. 10 is a top view of the clip member.
Figure 11:
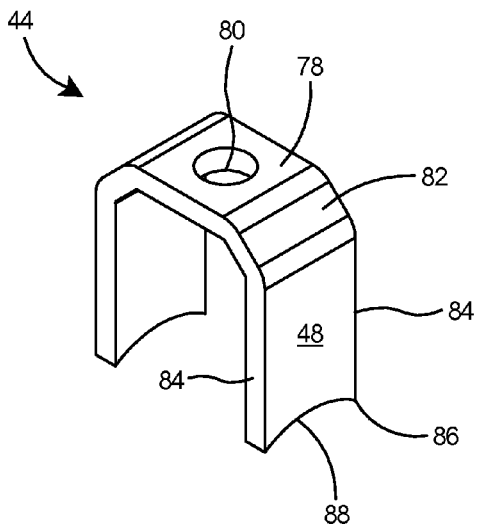
FIG. 11 is an isometric view of the wire gripper.
Figure 16:
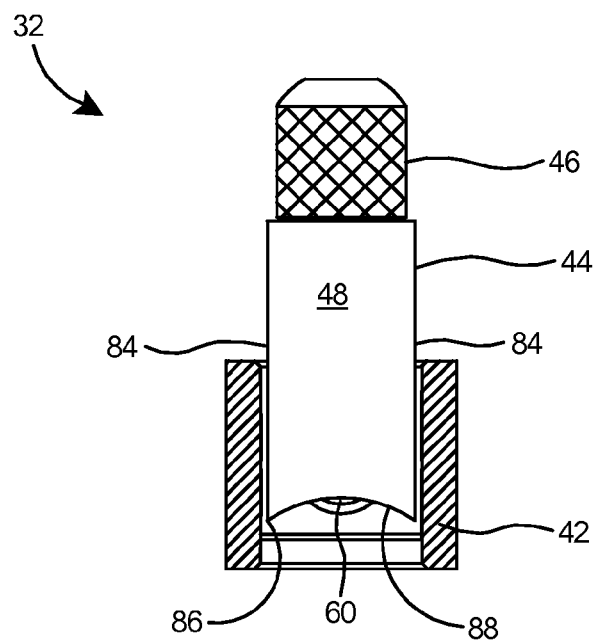
FIG. 16 is a sectional view of the wire gripper assembly taken along line 16-16 of FIG. 12.
Figure 17:
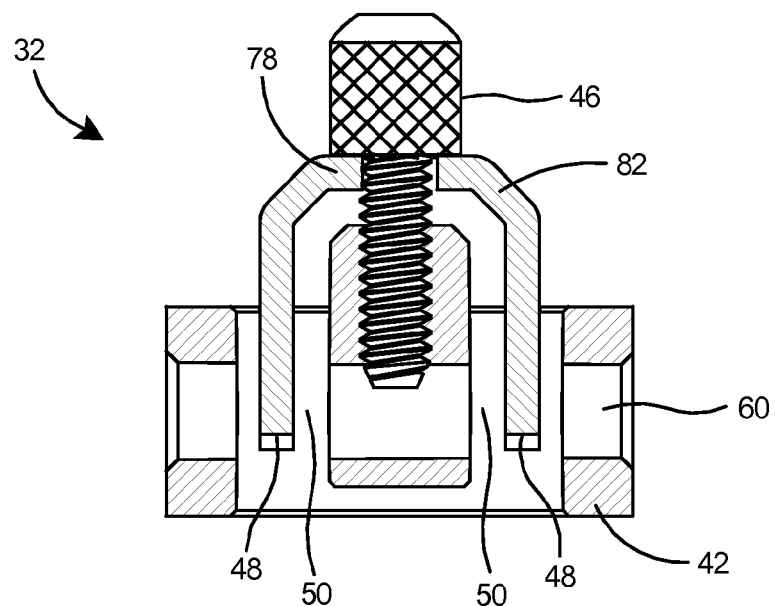
FIG. 17 is a sectional view of the wire gripper assembly taken along line 17-17 of FIG. 14.

With reference to FIGS. 8-11, the clip member 44 includes a base 78 with an aperture 80 centered therein. The legs 48 are orthogonal with respect to the base 78. As shown in FIG. 8, the clip 44 includes shoulders 82 connecting the base with the legs 48. The shoulders 82 extend at an angle of θ1 with respect to the base 78. Preferably, angle θ1 is between 35 and 55 degrees. Inclusion of shoulders 82 strengthen the legs 48 with respect to the base 78. As shown in FIG. 9, the legs 48 include two sides 84 and leg ends 86. The leg ends 86 include a concave arcuate surface 88 extending between the two sides 84 of the leg ends.

Figure 6:
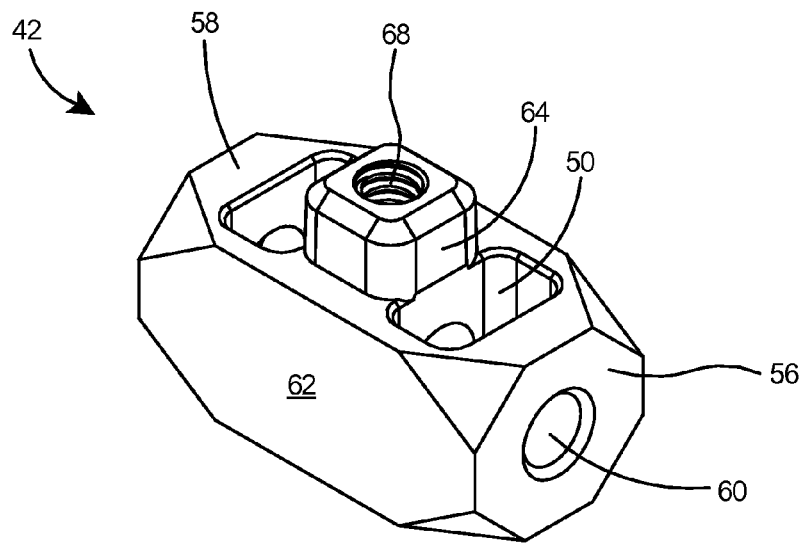
FIG. 6 is a top isometric view of the wire gripper body.
Figure 7:
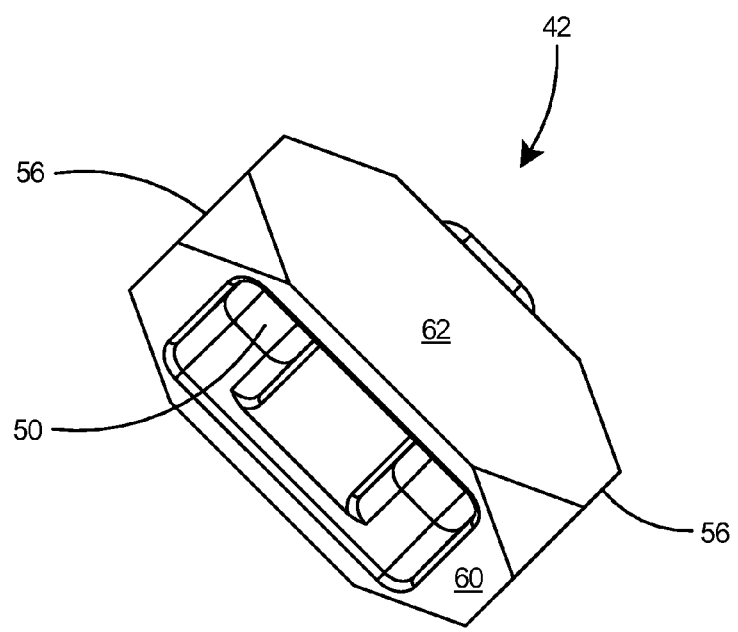
FIG. 7 is a bottom isometric view of the wire gripper body.

Referring to FIGS. 12-15, the wire gripper 32 is an assembly of the body 42, the clip member 44, and the thumbscrew 46. When assembled, the thumbscrew 46 can be tightened to bear against the base 78 of the clip 44 and thereby urge legs 48 of clip 44 into threaded bore 68 (see FIG. 6) in wire gripper body 42. With thumbscrew 46 extending through aperture 80 in the base 78 of the clip 44 and threaded into threaded bore 68, legs 48 of clip member 44 extend into the channels 50 of body 42. As shown in FIG. 14, the arcuate surface 88 of each leg 48 of clip 44 is substantially centered in the through bore 66. Thus as thumbscrew 46 is tightened within threaded bore 68, the arcuate surfaces 88 at the ends of each leg 48 will advance farther into each channel 50 of wire gripper body 42.

Figure 18:
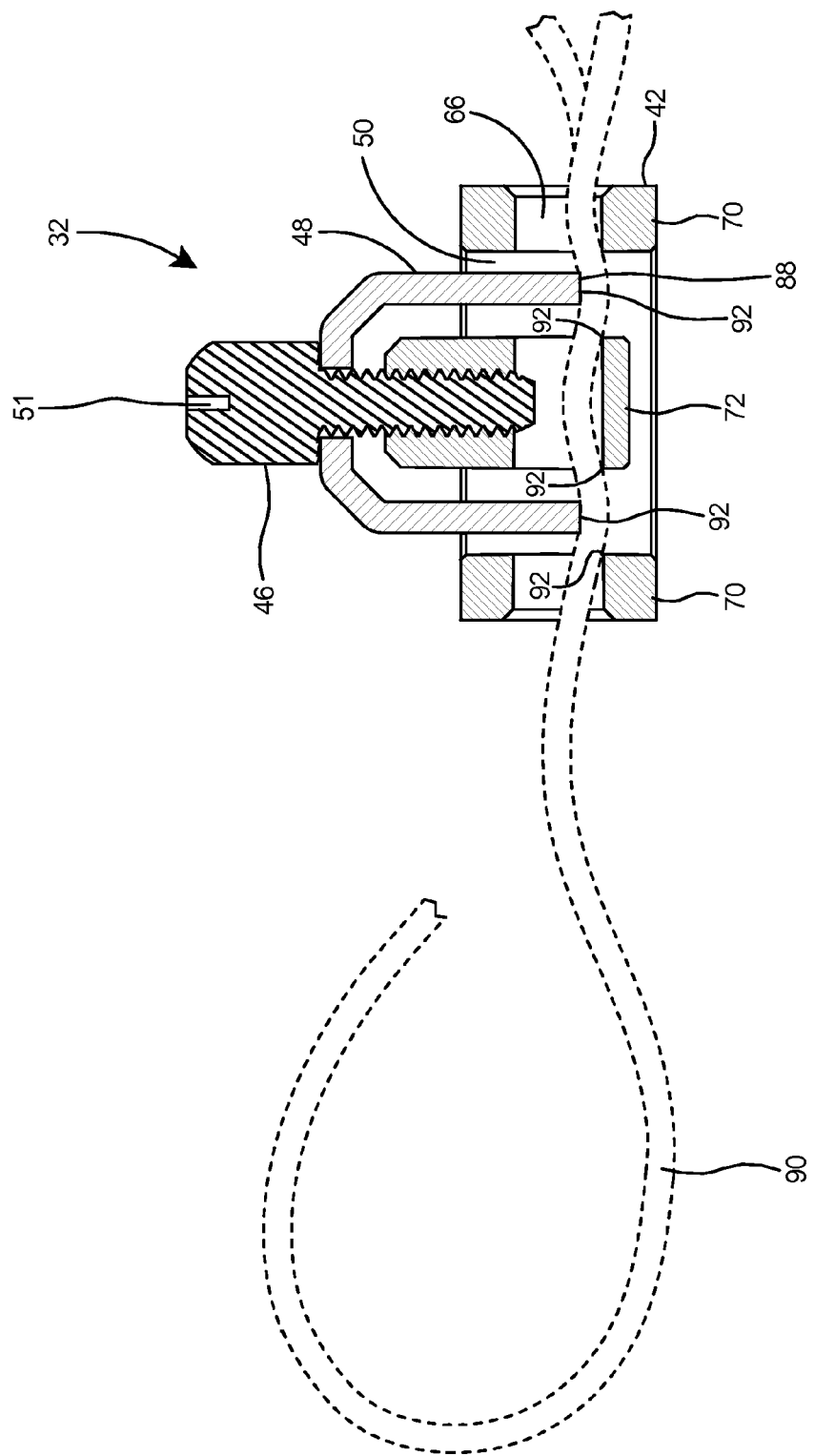
FIG. 18 is a sectional view of the wire gripper assembly taken along line 17-17 of FIG. 14 and including a wire inserted and secured therein.

With reference to FIG. 18, the wire gripper assembly 30 of the present invention is used to anchor or support a suspended load or electrical device such as an electrical box or light fixture (not shown). To secure a wire or cable 90 within the wire gripper 32, the thumbscrew 46 is first loosened sufficiently to withdraw legs 48 from channels 50, thereby opening through bore 66 and enabling the installer to thread the cable 90 through the through bore 66 one or more times. The cable 90 may be doubled up through the through bore 66. The thumbscrew 46 is first tightened by hand, thereby forcing arcuate surfaces 88 of legs 48 against the cable 90. As arcuate surfaces 88 of legs 48 press against the cable 90, the cable is in turn pressed against both ends 74 of ledge 72 and end portions 70 of body 42. A screw driver (not shown) is then inserted into slot 51 to fully tighten thumbscrew 46 against the cable 90. With the thumbscrew 46 fully tightened in the wire gripper 32, six points of contact 92 on the cable 90 are established within the wire gripper 32 including at the arcuate surfaces 88 of each leg 48 of clip member 44, at each end portion 70 of body 42, and at each end 74 of the ledge 72. After the thumbscrew 46 is fully tightened, the wire gripper 32 securely holds the suspended load. In the preferred embodiment of the wire gripper 32, the diameter D1 of the through bore 66 is at least two and a half times the diameter D2 of the cable 90. For use with a stranded wire cable 90 having a diameter D2 of 0.080-inch for example, the diameter of the through bore 66 is preferably at least 0.020-inch.

Referring to FIG. 21, the preferred embodiment of the wire gripping assembly 30 includes the wire gripper 32 and the cable 34 including an end connector 36 thereon. The end connector 36 is a loop on one end of the cable 34. The wire gripping assembly 30 includes the wire gripper 32 and the cable 34. For initial tightening, thumbscrew 46 can be tightened against cable 34 within wire gripper assembly 30 by hand. Subsequently a screw driver is used to secure an electrical device to a support using the wire gripping assembly 30.

Figure 22:
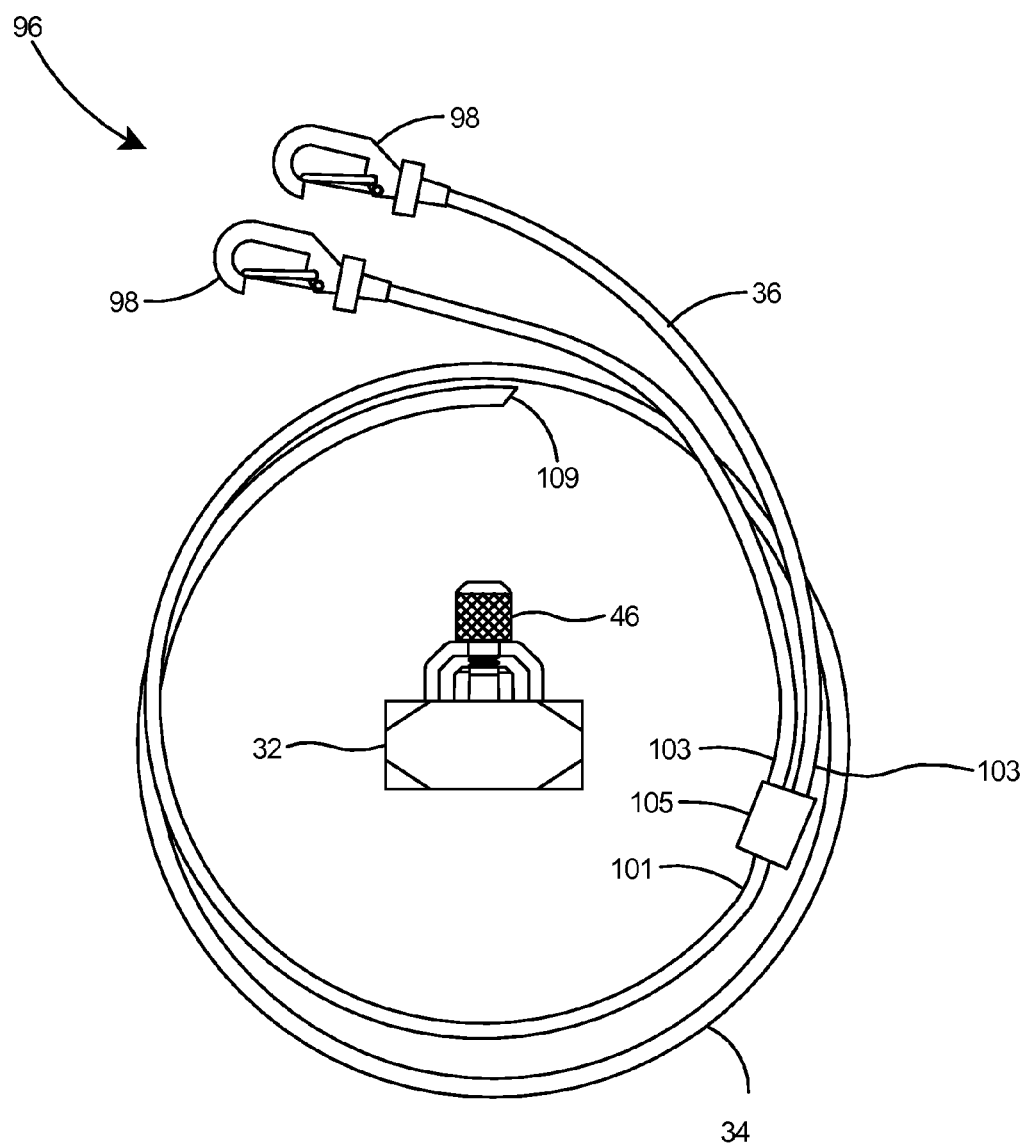
FIG. 22 is a plan view of a an alternate embodiment of a wire gripping assembly for supporting a light fixture.

With reference to FIG. 22 there is shown a second embodiment of a wire gripping assembly 96 according to the present invention. Wire gripping assembly 96 is for securing an electrical device (not shown) to a support. Wire gripping assembly 96 includes the wire gripper 32, and the cable 34 including an end connector 36 thereon. The end connector 36 in wire gripping assembly is a snap hook 98. Most preferably, the end connector 36 includes two snap hooks 98. Cable 34 includes a first portion 101 and two opposing end portions 103 joined to first portion 101 by a joint 105.

Figure 19:
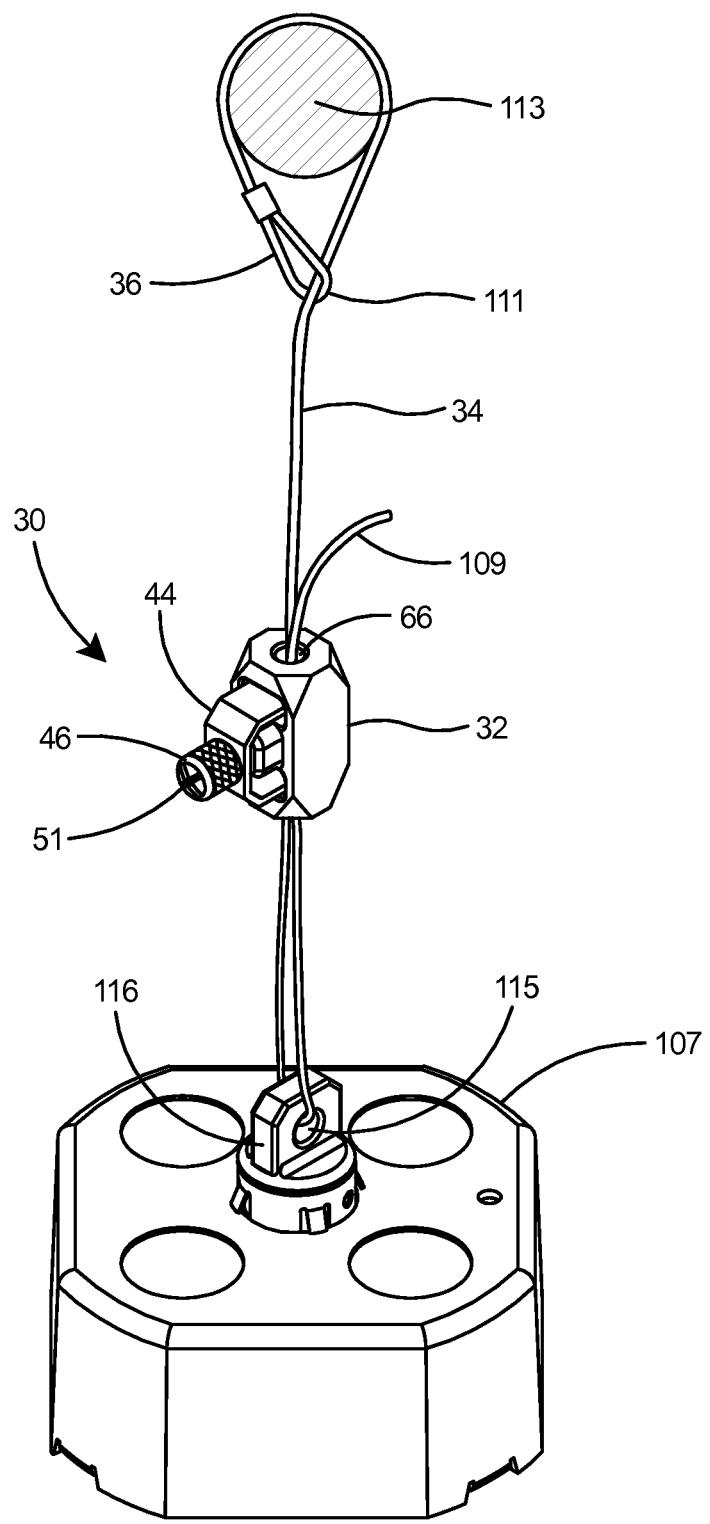
FIG. 19 is an isometric view of the wire gripping assembly of the present invention supporting an electrical box.

FIG. 19 illustrates an example of the preferred embodiment of a wire gripping assembly 30 according to the present invention supporting an electrical box 107. The wire gripping assembly 30 includes the wire gripper 32 and a cable 34 having a free first end 109 and a second end 111 with an end connector 36 thereon. The end connector 36 is a loop on the first end 109 of the cable 34. To operate the wire gripping assembly 30, the second end 111 of the cable with end connector 36 is passed around the support 113 and the free first end 109 of the cable 34 is passed through the end connector 36. The first end 109 of the cable 34 is then run through bore 66 of wire gripper 32, then through aperture 115 in knockout engagement member 116 of electrical box 107, and then passed again through bore 66 of wire gripper 32. The thumbscrew 46 is then tightened by hand to initially secure electrical box 107 to support 113. Installation is completed by inserting and turning a screwdriver (not shown) within slot 51 of thumbscrew 46.

Figure 20:
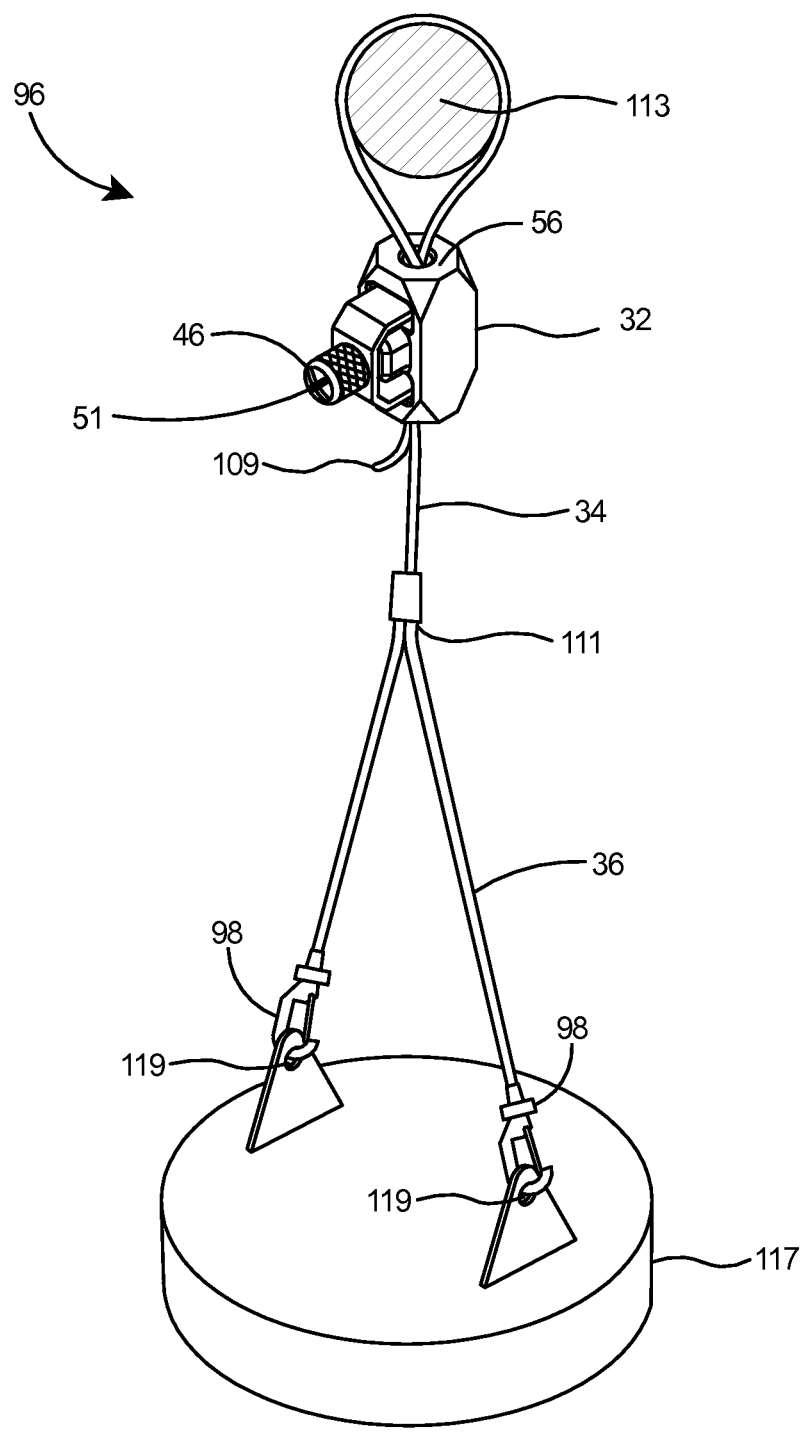
FIG. 20 is an isometric view of the wire gripping assembly of the present invention supporting a light fixture.

FIG. 20 illustrates an example of the second embodiment of a wire gripping assembly 96 according to the present invention supporting a light fixture 117. The wire gripping assembly 96 includes the wire gripper 32 and a cable 34 having a free first end 109 and a second end 111 with an end connector 36 thereon. The end connector 36 is a pair of snap hooks 98. To operate the wire gripping assembly 96, the snap hooks 98 of end connector 36 on second end 111 of cable 34 are first secured through apertures 119 of light fixture 117. The free first end 109 of cable 34 is then passed through the bore 66 of the wire gripper 32, around the support 113, and then back through the bore 66 of wire gripper 32. As the desired tension is applied by hand to the first end 109 of cable 34, thumbscrew 46 is hand tightened to initially secure light fixture 117 to support 113. Installation is completed by inserting and turning a screwdriver (not shown) within slot 51 of thumbscrew 46. xx The wire gripper body 42, clip 44, and thumbscrew 46 are all preferably constructed of metal. Preferably, the body 42 is constructed of a die cast alloy. Most preferably, the body 42 is die cast of ZAMAK, a casting alloy comprised mainly of zinc alloyed with aluminum, magnesium, and copper and available from Eastern Alloys of Maybrook, N.Y. Most preferably, the clip 44 is constructed of hot dipped galvanized steel in a thickness of at least 0.093-inch and with a minimum plating thickness of at least 0.0005-inch per side of the clip. It is important that clip 44 have sufficient thickness so that the legs 48 are rigid and therefore bear against an inserted wire or cable when the thumbscrew 46 is fully tightened. Most preferably, the thumbscrew 46 is a No. 10-24×⅝-inch long knurled head tri-drive machine screw with serrations. The wire gripper 32 of the present invention is rated to support a load of 50 pounds with a 0.62-inch diameter wire, 100 pounds with a 0.80-inch diameter wire, and 150 pounds with a 0.93-inch diameter wire.

Most preferably, the cable 34 of drop wire kits 30 and 96 is galvanized stranded wire of 7×7 stranded construction having a 0.080-inch (2.0 mm) core diameter, a galvanized zinc plating of at least 0.00015-inch thickness, and a break strength of 500 pounds. Most preferably, at least a 5-foot length of cable is provided for each wire gripper 32 provided in the kit.

In addition to the wire gripper 32 and the cable 34, drop wire kit 30 may also include an electrical box 107, such as the FBS415 electrical box, available from Arlington Industries, Inc. of Scranton, Pa.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A wire gripping assembly for supporting a load from a support, said wire gripping assembly comprising:
    a wire gripper including a wire gripper body, a through bore longitudinally through said body, a clip member, and a thumbscrew for adjusting said clip member with respect to said body;
    said wire gripper body including a base portion having two ends, a top, a bottom, two sides, a boss integral with said base portion and extending orthogonally from said top of said base portion, and an open channel in said base portion on either side of said boss, said open channel extending from said top to said bottom of said base portion;
    a cable including a first end and a second end; and
    an end connector on said second end of said cable, whereby one of said ends of said cable is adapted to secure to said load, a second of said ends is adapted to secure to said support, and said thumbscrew is capable of being hand tightened to secure said cable to said wire gripper assembly.

2. The wire gripping assembly of claim 1 wherein said clip member includes
    a base having two ends and a shoulder extending from each end of said base; and
    a leg extending from each shoulder.

3. The wire gripping assembly of claim 2 wherein said shoulders extend from said base at an angle of 35 to 55 degrees.

4. The wire gripping assembly of claim 2 wherein
    said legs include two sides and leg ends; and
    said leg ends include a concave arcuate surface extending between said sides of said leg ends.

5. The wire gripping assembly of claim 2 wherein said wire gripper assembly includes said legs of said clip member extending through said open channel of said wire gripper body.

6. The wire gripping assembly of claim 1 wherein said end connector is selected from the group including a loop and snap hook.

7. The wire gripping assembly of claim 1 wherein said end connector is a snap hook.

8. The wire gripping assembly of claim 1 wherein said clip member and said thumbscrew are constructed of metal.

9. The wire gripping assembly of claim 1 wherein said wire gripper body is die cast in one piece of zinc die cast alloy.

10. The wire gripping assembly of claim 1 wherein
    said thumbscrew includes a head having an outer circumference; and
    said outer circumference of said head includes serrations thereon.

11. The wire gripping assembly of claim 1 wherein said diameter of said through bore in said body is at least two and a half times the diameter of said cable.

12. The wire gripping assembly of claim 1 wherein
    said thumbscrew includes an end; and
    said end of said head includes a slot therein.

13. A wire gripping assembly for supporting a load from a support, said wire gripping assembly comprising:
    a wire gripper including a wire gripper body, a through bore longitudinally through said body, a clip member, and a thumbscrew for adjusting said clip member with respect to said body;
    said wire gripper body including a base portion having two ends, a top, a bottom, two sides, and a boss integral with said base portion and extending orthogonally from said top of said base portion;
    a cable including a first end and a second end;
    an end connector on said second end of said cable, whereby one of said ends of said cable is adapted to secure to said load, a second of said ends is adapted to secure to said support, and said thumbscrew is capable of being hand tightened to secure said cable to said wire gripper assembly;
    a threaded bore in said boss;
    said through bore extends through said boss thereby forming a ledge in said boss immediately below said through bore; and
    said ledge includes two ends.

14. The wire gripping assembly of claim 13 wherein said ends of said body include end portions surrounding said through bore.

15. The wire gripping assembly of claim 14 wherein when said thumbscrew is in a completely tightened state, the wire gripping includes six points of contact on said wire.

16. The wire gripping assembly of claim 15 wherein said points of contact include
    said end portions of said body against said wire;
    said arcuate surfaces on said leg ends of said clip against said wire; and
    said ends of said ledge against said wire.

* * * * *